United States Patent [19]
Sollott et al.

[11] 3,759,967
[45] Sept. 18, 1973

[54] SILICON DERIVATIVES OF FERROCENE

[75] Inventors: Gilbert P. Sollott, Plymouth Meeting; William R. Peterson, Levittown, both of Pa.

[73] Assignee: The United States of America as represented by the Secretary of the Army, Washington, D.C.

[22] Filed: Sept. 12, 1968

[21] Appl. No.: 759,492

[52] U.S. Cl. .............................. 260/439 CY, 252/71
[51] Int. Cl. ........................... C07f 15/02, C07f 7/08
[58] Field of Search ............................ 260/439 CY

[56] References Cited
UNITED STATES PATENTS

| | | | |
|---|---|---|---|
| 3,310,577 | 3/1967 | Sollott.................................. | 260/439 |
| 3,324,157 | 6/1967 | Wilkus et al......................... | 260/439 |
| 3,418,350 | 12/1968 | Sollott et al. ....................... | 260/439 |
| 3,432,533 | 3/1969 | Rosenberg........................... | 260/439 |

OTHER PUBLICATIONS

Sollott et al., J. Organometal Chem. 4 (1965) p. 491–493.

Sollott et al., Abstract of Paper Presented at 3rd International Symposium on Organometallic Chemistry, Munich, Aug. 28 – Sept. 1, 1967.

Sollott et al., (III) Organic Chem., Vol. 30 (1965), p. 389–393.

Post, Silicones and Other Organic Silicon Compounds, Reinhold Publishing Corp, New York, N.Y., 1949, p. 15–17

Topchiev, Chem. Abstracts, Vol. 62, (1965) Column 8713

*Primary Examiner*—Daniel E. Wyman
*Assistant Examiner*—A. P. Demers
*Attorney*—Harry M. Saragovitz, Edward J. Kelly, Herbert Berl and S. Dubroff

[57] ABSTRACT

Silyation of ferrocene in $AlCl_3$-catalyzed reactions with aminosilanes, chlorosilanes or aminochlorosilanes, constituting successful use of halosilanes in reactions analogous to Friedel–Crafts alkylation, and providing a novel, facile route to silicon compounds of ferrocene.

1 Claim, No Drawings

SILICON DERIVATIVES OF FERROCENE

The invention described herein may be manufactured, used and licensed by or for the Government for governmental purposes without the payment to us of any royalty thereon.

This invention relates to ferrocene compounds and more particularly concerns new methods for synthesizing silicon compounds of ferrocene.

The structure of ferrocene (FcH), bis-cyclopentadienyliron, may be described as a sandwich-type structure having an iron atom between two staggered cyclopentadiene rings:

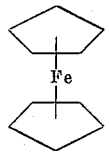

Other and further objects of the invention will become apparent as the invention is further described hereinafter.

Silicon derivatives of ferrocene are useful for high temperature lubricants and hydraulic fluids. They are known for their ability to promote long term lubricity. They also serve as satisfactory gelling agents.

Briefly, we have discovered that ferrocene may be caused to react with a chlorosilane, aminosilane, or aminochlorosilane and anhydrous $AlCl_3$ in a suitable solvent such as refluxing n-heptane or n-octane. The silylated ferrocenes obtained are presented in Table I.

The various products presented in Table I above were synthesized in accordance with the generic procedure outlined below:

A solution of 0.1 mole of the chlorosilane, aminosilane, or amino-chlorosilane in 50 ml of n-heptane or n-octane is added dropwise under dry nitrogen over a period of about 10 minutes to ferrocene and aluminum

TABLE I.—SILYLATION OF FERROCENE (FCH)

| Silane | Molar rates, FcH:silane:$AlCl_3$ | Solvent [a] | Products (yield, percent) [b] | | Recovered FcH, percent |
|---|---|---|---|---|---|
| $(C_6H_5)_2Si(Cl)N(C_2H_5)_2$—diphenyl(N,N-diethylamino) chlorosilane. | 2:1:1 | n-Octane | FcSi(OH)($C_6H_5$)$_2$ (26)—ferrocenyldiphenylsilanol. | (Fc)$_2$Si($C_6H_5$)$_2$ (4)—diferrocenyldiphenylsilane. | 54 |
| $(CH_3)_2Si(Cl)N(CH_3)_2$[c]—dimethyl(N,N-dimethylamino) chlorosilane. | 2:1:1 | n-Heptane | FcSi(OH)($CH_3$)$_2$ (7)—ferrocenyldimethylsilanol. | [FcSi($CH_3$)$_2$]$_2$O (27)—ferrocenyldimethyl disiloxane. | 75 |
| $(CH_3)_2Si(Cl)N(CH_3)_2$[c]—dimethyl(N,N-dimethylamino) chlorosilane. | 2:1:2 | do | FcSi(OH)($CH_3$)$_2$ (53)—ferrocenyldimethylsilanol. | [FcSi($CH_3$)$_2$]$_2$O (16)—ferrocenyldimethyl disiloxane. | 38 |
| $(C_6H_5)_3SiCl$—triphenylchlorosilane. | [d]1:1:1 | n-Octane | FcSi($C_6H_5$)$_3$ (6)—ferrocenyltriphenylsilane. | | 62 |
| $(C_6H_5)_3SiN(CH_3)_2$—triphenyl(N,N-dimethylamino) silane. | 1:1:1 | do | FcSi($C_6H_5$)$_3$ (8)—ferrocenyldimethylsilanol. | | 32 |
| $(C_2H_5)_2Si(Cl)N(C_2H_5)_2$—diethyl(N,N-diethylamino) chlorosilane. | 1:1:1 | n-Heptane | FcSi(OH)($C_2H_5$)$_2$ (41)—ferrocenyldiethylsilanol. | | 29 |
| $[(CH_3)_2N]_2SiCl_2$—bis(N,N-dimethylamino) dichlorosilane. | 4:1:2 | n-Octane | Fc$_2$Si(OH)$_3$ (4)—diferrocenylsilanediol. | Fc$_2$SiOH (5)—triferrocenylsilanol. | 51 |

[a] Reflux time: 20 hours.
[b] Based on the silane.
[c] Products could not be isolated when $(CH_3)_2SiCl_2$ was used.
[d] A half equivalent of triethylamine was included in the reaction mixture. The product could not be isolated in its absence.

In preparing ferrocene derivatives containing silicon, prior art methods involved:

a. Lithiating ferrocene, then reacting the resultant lithiated ferrocene with a halosilane;

FcH $\xrightarrow{Mercuric\ acetate}$ Ferrocenylmercuric acetate $\xrightarrow{KCl}$ Ferrocenylmercuric chloride $\xrightarrow{Ethyl\ Lithium}$ FcL; $\xrightarrow{R_3SiCl}$ FcSiR$_3$, where Fc = ferrocenyl = bis(cyclopentadienyl)iron
R = alkyl or aryl b. Coupling iron(II) chloride with a silylcyclopentadiene:

$(C_5H_6)_2 \xrightarrow{Na} C_5H_5Na \xrightarrow{R_3SiCl} C_5H_5SiR_3 \xrightarrow{Na} NaC_5H_4R_3 \xrightarrow{FeCl_2}$ Fe($C_5H_4SiR_3$)$_2$ The methods outlined in a. and b. above are tedious and time-consuming multi-step processes which involve the use of air-sensitive organometalic reagents. In the prior art method b. abovedescribed, only 1, 1'-disubstituted ferrocene derivatives are formed, and not monosubstituted derivatives. Silanols, compounds useful for further synthesis, are not readily obtainable by methods a. and b. above.

It is therefore an object of this invention to provide improved methods for synthesizing silicon derivatives of ferrocene, the methods employing a single step and requiring the preparation of no organometallic intermediates.

Another object of the invention is to provide methods as aforedescribed wherein silanols are readily obtainable products thereof.

chloride in the same solvent (100 ml). the mixture is refluxed for 20 hours and then treated with water. The products are isolated through chromatographical means using activated alumina.

Reference is hereby made to patent application, Ser. No. 759,493, now abandoned, of the same inventors for "Germanium Derivatives Of Ferrocene," filed of even data herewith, and assigned to the same assignee thereof.

We claim:

1. A process for synthesizing ferrocenyltriphenylsilane comprising
   adding a solution of about 0.1 mole triphenylchlorosilane and 0.05 mole of triethylamine in about 50 ml n-octane to a mixture of ferrocene and aluminum chloride in about 100 ml n-octane to form a reaction mixture wherein the molar ratio of ferrocene:chlorosilane: $AlCl_3$ is 1:1:1, said chlorosilane and triethylamine solution being added dropwise under nitrogen over a period of about 10 minutes to said mixture of ferrocene and aluminum chloride,
   refluxing said reaction mixture for about 20 hours,
   treating said refluxed mixture with water to liberate products, and
   isolating said liberated products to yield said ferrocenyltriphenylsilane.

* * * * *